United States Patent

Ling

[11] 4,208,125
[45] Jun. 17, 1980

[54] CLOUD ALTITUDE MEASURING APPARATUS

[75] Inventor: Bernt Ling, Vesteras, Sweden

[73] Assignee: ASEA Aktiebolag, Vesteras, Sweden

[21] Appl. No.: 911,229

[22] Filed: May 31, 1978

[30] Foreign Application Priority Data

Jun. 3, 1977 [SE] Sweden ................................. 7706529

[51] Int. Cl.² ............................................... G01C 3/08
[52] U.S. Cl. .................................... 356/5; 343/17.1 R
[58] Field of Search ........................ 356/5; 343/17.1 R

[56] References Cited

U.S. PATENT DOCUMENTS

| 3,741,655 | 6/1973 | Ling et al. | 356/5 |
| 4,121,889 | 10/1978 | Soderstrom | 356/5 |
| 4,134,677 | 1/1979 | Ling et al. | 356/5 |

Primary Examiner—S. C. Buczinski
Attorney, Agent, or Firm—Watson, Cole, Grindle & Watson

[57] ABSTRACT

Cloud altitude measurement is carried out in a step-by-step manner wherein the measuring distance is changed by a predetermined amount for each measurement step. First and second integrators respectively integrate reflected echo signals during respective first and second time intervals $T_1$, $T_2$ with $T_1 < T_2$. The first integrator integrates reflected light pulses and noise and the second integrator integrates noise. The difference between the integrated signal outputs from the first and second integrators is determined by a summation device and a controllable level-sensing signal evaluating device emits a signal if the aforesaid difference exceeds a predetermined value. The signal evaluating device is controlled to emit the indicating signal when a number of consecutive measurement steps have been measured. The first and second integrators can be controlled to integrate over a plurality of consecutive measurement steps before being reset to zero or alternatively, integration is performed over one or more measurement steps at a time. In the latter case, the measuring apparatus further comprises an analog/digital convertor connected to the output of the summation device, an accumulator, and the digital output signal from the analog/digital convertor is transferred to the accumulator and the evaluation device after the predetermined number of measurements. The measurement apparatus can be further modified to include a shift register connected to the output of the analog/digital convertor and an accumulator having inputs respectively connected to the input and output of the shift register and wherein a timing circuit actuates the level-sensing signal evaluating device to examine the contents of the accumulator after each measurement step.

4 Claims, 10 Drawing Figures

CLOUD ALTITUDE MEASURING APPARATUS

BACKGROUND OF THE INVENTION

1. Field of the Invention

This invention relates to cloud altitude measuring apparatus, and particularly to such apparatus wherein the range of the measurement is extended.

2. Prior Art

U.S. patent application Ser. No. 771,261, now U.S. Pat. No. 4,121,889, assigned to the same Assignee as the present invention, relates to a cloud altitude measuring means by which the height of a cloud is measured in steps of a certain number of meters per step. For each measuring step the signal emitter emits a series of light pulses. The signal receiver includes two integrating devices, each of which is made operative during a time interval occurring at a certain time $T_1$ and $T_2$, respectively, after each emitted light pulse to receive signals during the time interval. The magnitude of the signals corresponds to the magnitude of the received echo signal as well as any noise signals. Because time $T_1 <$ time $T_2$, the integrating device, which is intended for measuring the height to the cloud, receives echo signals from the lower of the two levels corresponding respectively to times $T_1$, $T_2$. The second integrating device, which during the measurement receives echo signals from a higher height, is employed for indicating any accompanying noise. The two signals are supplied to a summation device in which the difference, between the sum of the first signals and the sum of the second signals from a series of light pulses, is determined. When this difference exceeds a certain adjustable value, the existence of a cloud is registered. After each measuring series the integrators are set to zero and a new series of light pulses are emitted in a new measuring step.

The measurement takes place in steps up to a certain specified height, which may be, for example, 1500 m. If a cloud is present at a lower height, this is indicated, whereafter a new measurement starts from the minimum height of the measuring device. If a cloud is not indicated up to the normal measuring height, here designated N, the stepping-up is interrupted and a new measurement starts again according to the above described procedure. The normal measuring height mentioned is selected so that a safe indication is obtained if clouds exist up to that height.

SUMMARY OF THE INVENTION

The present invention relates to an altitude measuring device by which the range of the known cloud altitude measuring means can be considerably extended. According to a preferred embodiment of the invention, the integrators and the summation devices are arranged to treat a plurality of consecutive series of signals before the indicating devices are made operative.

According to the present invention, the measurement is not interrupted if a cloud is not detected up to the normal measuring height N. Instead the measurement is continued in steps and with the same length of steps as previously specified, for example 5 m. Contrary to the previous case, each measurement value is not based on one single series of measurements, but several consecutive steps are evaluated in the same measurement operation. If the conditions are ideal and, for example, sixteen steps are integrated in the same measurement operation, during which the measurement distance increases by $16 \cdot 5 = 80$ m, a number of $16 \cdot n$ pulses per measurement is obtained instead of n pulses as before.

The range of the cloud altitude measuring means is approximately proportional to $\sqrt[4]{}$ number of pulses in each integration. The range is proportional to the square root of the signal/noise ratio, but this relation is in turn proportional to the square root of the number of pulses which are integrated during the measurement. Under normal circumstances with measurement for each step, which according to the above includes n pulses, the range is thus approximately proportional to $\sqrt[4]{n}$. When a measurement according to the invention is carried out at a greater distance and with sixteen steps per measurement, the range is proportional to $\sqrt[4]{16 \cdot n} = 2\sqrt[4]{n}$. The range would thus increase to almost twice the previous range. In practice, however, a smaller range is obtained, which is due to the fact that the light penetrates into the cloud and reflection does not take place towards the edge of the cloud during the whole measurement operation. Also, there is a certain amount of leakage in the integrators, and so on. The number of steps per measurement depends, among other things, on the density of the cloud. A solid cloud requires a smaller number of steps since the light pulse is then rapidly absorbed in the cloud.

According to the invention it is thus possible to extend the measuring range beyond the normal range while maintaining the probability that false echoes are received. The cloud altitude can be measured if the measurement continues until the integrating device for the cloud echo signals has significantly greater contents than the integrating device for the noise signals.

BRIEF DESCRIPTION OF THE FIGURES

The accompanying drawing shows three alternative embodiments of the cloud altitude measuring means according to the invention.

According to FIG. 1 the echo signals from a number of emitted light pulse series are summed up whereafter the integrator is set to zero;

Figure 2:
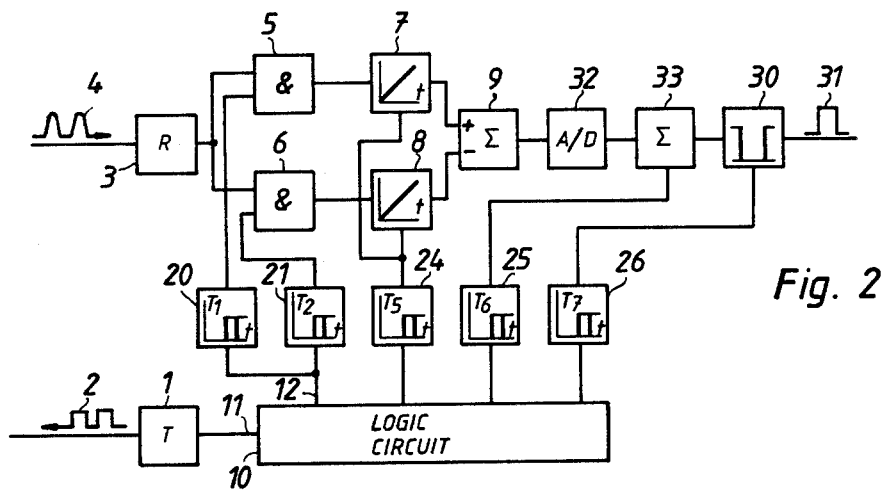
Figure 3:
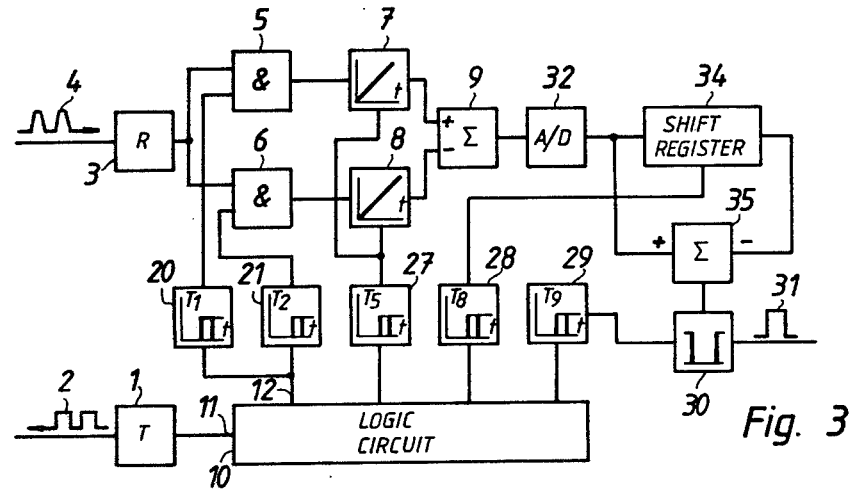
Figure 4A:
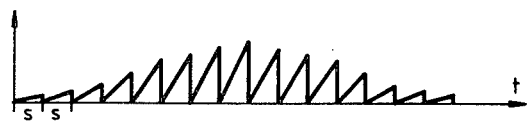
Figure 4B:
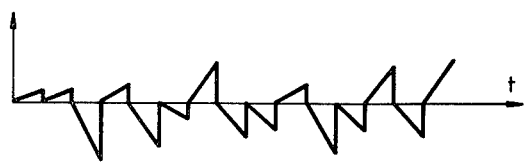
Figure 4C:
Figure 4D:
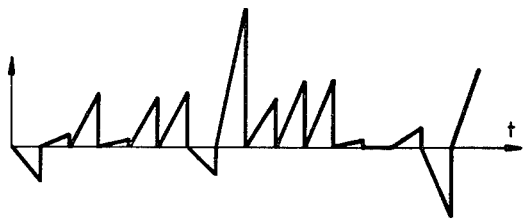
Figure 5A:
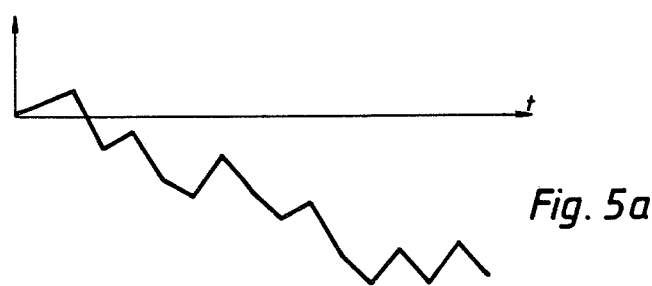
Figure 5B:
Figure 5C:
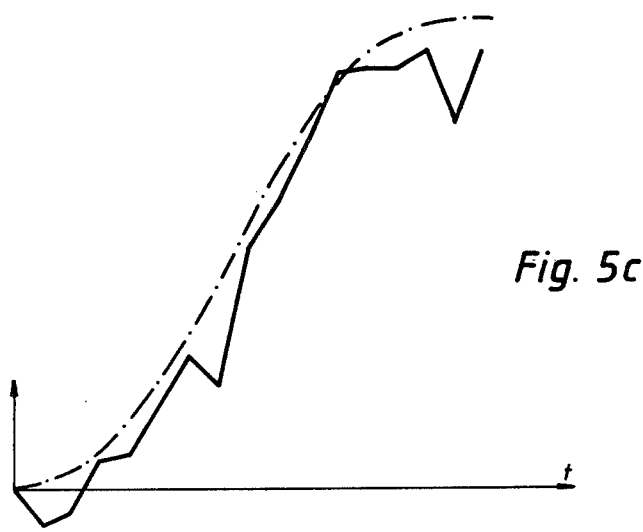

In the measuring means according to FIG. 2 measurement takes place step-by-step, but the result is accumulated and is only indicated after a number of measuring steps;

The means according to FIG. 3 is a modification of FIG. 2 in that the indication is carried out in steps but each indication comprises a plurality of measuring steps;

FIGS. 4a to 4d show signals occurring during integration and evaluation, step-by-step according to a known method; and FIGS. 5a to 5c show the signals in the case of integration over a plurality of measuring steps.

DETAILED DESCRIPTION

In all the Figures the cloud altitude measuring means comprises signal emitter 1 emitting a series of laser light pulses 2. Signal receiver 3 receives a series of echo signals 4, including any noise, and transforms the light signals into electrical signals. The signals are supplied to one input of two AND gates 5, 6, the outputs of which are each connected to integrator 7, 8. The outputs of integrators 7, 8 are each connected to an input of summation device 9, integrator 7 being connected to the positive input of the summation device and the output of integrator 8 being connected to the negative input of the summation device. This means that the signal on the output of the summation device corresponds to the difference between the contents of the two integrators 7, 8.

The functions of the measuring means are controlled from logic circuit 10. From output 11 of logic circuit 10 the emission of light pulse series from signal emitter 1 is controlled with a specified number of light pulses in each series. Control pulses are emitted from output 12 to two time delay circuits 20, 21 which, after a certain time delay $T_1$ and $T_2$, respectively, supply the control pulses to the second input of gates 5 and 6, respectively, so that the gates are opened and the signal from signal receiver 3 is supplied to the corresponding integrator 7 or 8, respectively. Since the same control pulse from logic circuit 10 is supplied to both gates they are open for an equally long period t each time. However, $T_1 < T_2$, which means that gate 5 opens first and admits echo signals from a lower level than does gate 6. Time t is a time interval, and the difference between $T_1$ and $T_2$ must be greater than time interval t. Thus, both integrators 7, 8 must not receive signals simultaneously. Times $T_1$ and $T_2$ correspond to the time required for a light pulse to travel from signal emitter 1 to a point of reflection and back to signal receiver 3. The distance corresponding to half of $T_1$ is chosen as the measuring distance, so when integrator 7 receives an echo signal from a cloud the existence of a cloud at this altitude is detected.

During the measurement, the stepping is preferably carried out from a lower towards a higher height. This means that if a cloud is present in the path of the emitted light beam, integrator 8 will receive the cloud echo signal first, but since the output signal of this integrator is supplied to the negative input of the summation device it does not provide any positive output signal therefrom. For each forward stepping, times $T_1$ and $T_2$ increase by an amount which is commensurate to twice the value of the step length, and when the measuring distance has increased so that $T_1$ corresponds to the cloud height, the echo signals appear at integrator 7, and the summation device has a positive additional charge for each measuring pulse. In this situation integrator 8 receives echo signals from a point inside or beyond the cloud. These echoes are damped in the cloud and normally have low values. Both integrators 7, 8 receive noise signals, but since these are substantially equal for both integrators and are supplied to the summation device with opposite signs, their effect on the output signal of the summation device is eliminated.

At the beginning of the measurement, logic circuit 10 delivers a pulse to time delay circuit 23 which, after time $T_4$, delivers a control pulse to level sensing signal evaluating device 30, in which the contents of summation device 9 are evaluated with regard to a value set in the level device, the echo signals received during the measurement thus being evaluated. If the threshold level set in device 30 exceeds the measured value, an output signal 31 is emitted, which indicates the existence of a cloud. Time $T_4$ is set such that all the light pulse series in a measurement operation can be emitted and the corresponding echo signals be processed in integrators 7, 8 and summation circuit 9.

When the evaluation in device 30 is finished, integrators 7, 8 are reset to zero by a control pulse from time delay circuit 22. This control pulse is delayed the time $T_3$ from the start of the measurement. For the two last-mentioned control pulses, $T_3 > T_4$. When the integrators are set to zero, a new measurement operation can be started.

The measuring means according to FIG. 2 differs from that described above substantially only by somewhat different signal processing. The signal stored in summation device 9 during a measurement series is supplied to A/D convertor 32, the digital output signal of which is supplied to accumulator 33 by means of a control pulse from timing circuit 25. When the digital output signal is supplied to accumulator 33, integrators 7, 8 are reset to zero by means of a control pulse from timing circuit 24, whereafter a new measurement series is emitted. Here time $T_6$ for the control pulse to the accumulator is prior to time $T_5$ for the control pulse which resets the integrators to zero. Accumulator 33 is thus supplied with a certain signal for each emitted series of measurement pulses during the measurement. When the whole measuring procedure is over, the contents of accumulator 33 are evaluated by a control pulse with time delay $T_7$ from timing circuit 26 activating level evaluating device 30. If the contents of the accumulator have then reached a value set in the level evaluating device, output signal 31 is delivered and the existence of a cloud is indicated. After that the device is ready for renewed measurement.

In the measuring means according to FIG. 3, the input of shift register 34 is connected to the output of A/D convertor 32. Accumulator 35 has its plus input connected to the input of the shift register and its minus input connected to the output of the shift register. Shift register 34 is controlled from control circuit 28. When a measurement series is terminated, the contents of summation device 9 are transferred via A/D convertor 32 to shift register 34 as well as to the plus input of accumulator 35. When shift register 34 is full, each infeed of a number to the input thereof is preceded by an outfeed of a number therefrom to the minus input of accumulator 35. Thus, the contents of accumulator 35 correspond to the difference between the numbers fed into shift register 34 and those fed out from it. The feeding into shift register 34 takes place after the end of each measurement series, and therefore integrators 7, 8 are reset to zero after each measurement series as soon as its result has been fed in. After each measurement series the contents of accumulator 35 are evaluated in the manner described above by level sensing device 30 and output signal 31 therefrom is delivered when the contents exceed a specified value. The device thus provides a sequential indication of the existence of clouds.

In the description of FIG. 2 it has been assumed that the integration and resetting of integrators 7, 8 are carried out in steps with a series of emitted pulses per step. Of course, this mode of operation can be modified so that a measurement operation covers two or more measurement steps before the integration is ended and the integrators are reset to zero.

The improvement made by a measuring means according to the invention will be illustrated with reference to FIGS. 4a–4d and 5a–5c. FIG. 4a shows a perfect signal without disturbance when measuring a cloud height according to the known method, with evaluation for each measurement step, designated s in the Figure. The amplitude for each measurement step indicates the magnitude of the signal obtained for each measurement step. FIG. 4b shows the signal appearing on the output of integrator 8 and which, according to what has been described previously, corresponds to the noise signal at time $T_2$. FIG. 4c shows the signal which appears on the output of integrator 7 during each measuring step and which comprises the measurement signal plus noise appearing at time $T_1$. FIG. 4d shows the signal which appears on the output of summation device 9 and which, as has been explained previously, is the difference between the signal in FIG. 4c and the signal in FIG. 4b. It is clear from these Figures that when the cloud echo signals are weak the noise signals may be so strong that the cloud echo completely disappears.

Figure 1:
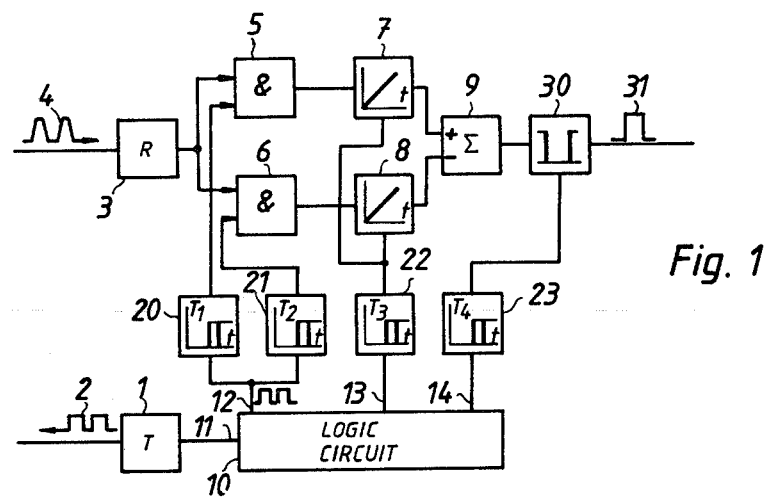

FIG. 5a shows the noise signal at the output of integrator 8 during a measurement comprising sixteen measurement steps where the measuring distance is changed after each step as shown in FIG. 1. The signals appearing for each individual measurement step correspond to the signals in FIG. 4b. FIG. 5b shows the integrated sum of the echo signal plus noise on the output of integrator 7, the individual measurement values being the same as in FIG. 4c. FIG. 5c shows the total integrated signal which appears on the output of summation device 9. The dash-lined curve in FIG. 5c shows the perfect echo signal according to FIG. 4a for a long integration during sixteen measurement steps. It is clear from FIG. 5c that the two curves agree with each other relatively well, and also that the signal received during integration over a plurality of consecutive measurement steps is considerably stronger and more clear than the signal in FIG. 4d during the stepwise integration and evaluation.

What is claimed is:

1. Cloud altitude measuring means, in which the measurement is carried out step-by-step and the measuring distance is changed by a predetermined value for each measurement step, comprising a signal emitter for emitting a series of light pulses for each measurement step; a signal receiver for receiving echo signals generated by the emitted light pulses upon reflection against an object, the reflected light pulses including noise; first and second integrators for integration of echo signals and noise received in respective first and second time intervals, said first and second integrators integrating reflected light pulses; a summation device for determining the difference between the integrated signal outputs from said first and second integrators; a controllable level-sensing signal evaluating device for emitting a signal if the difference between said integrated signal outputs exceeds a predetermined value; means for controlling said signal evaluating device to emit an indicating signal when a number of consecutive measurement steps have been measured; and said controlling means resetting said first and second integrators to zero.

2. Means according to claim 1, wherein said means for controlling also controls said first and second integrators to integrate echo signals and noise from a plurality of consecutive measurement steps before being reset to zero.

3. Means according to claim 1, wherein said means for controlling controls said first and second integrators to integrate echo signals and noise from at least one of said measurement steps at a time, and resetting said first and second integrators between each measurement of at least one measurement step, and further comprising an analog/digital convertor connected to the output of said summation device; an accumulator; said means for controlling transferring the digital output signal from said analog/digital convertor to said accumulator and said means for evaluating after a predetermined number of measurements; and said means for evaluating emitting a signal if the contents of said accumulator exceed a predetermined value.

4. Cloud altitude measuring means according to claim 1, wherein said means for controlling controls said first and second integrators to integrate echo signals and noise from one measurement step at a time, and resetting said first and second integrators after each said measurement step; and further comprising a shift register and an analog/digital convertor, said analog/digital convertor being connected to the output of said summation device, and said shift register being connected to the output of said analog/digital convertor; an accumulator having one input thereof connected to the input of said shift register and another input connected to the output of said shift register, said means for controlling including a timing circuit for actuating said level-sensing signal evaluating device to evaluate the contents of said accumulator after each measurement step and to emit a signal if said contents exceed a predetermined value.

* * * * *